Oct. 16, 1934.  H. L. BLUM  1,977,424
FLUID METER
Filed Sept. 21, 1927   6 Sheets—Sheet 1

Inventor:
Hosmer L. Blum
By Nissen & Crane Attys.

Oct. 16, 1934.  H. L. BLUM  1,977,424
FLUID METER
Filed Sept. 21, 1927   6 Sheets-Sheet 2

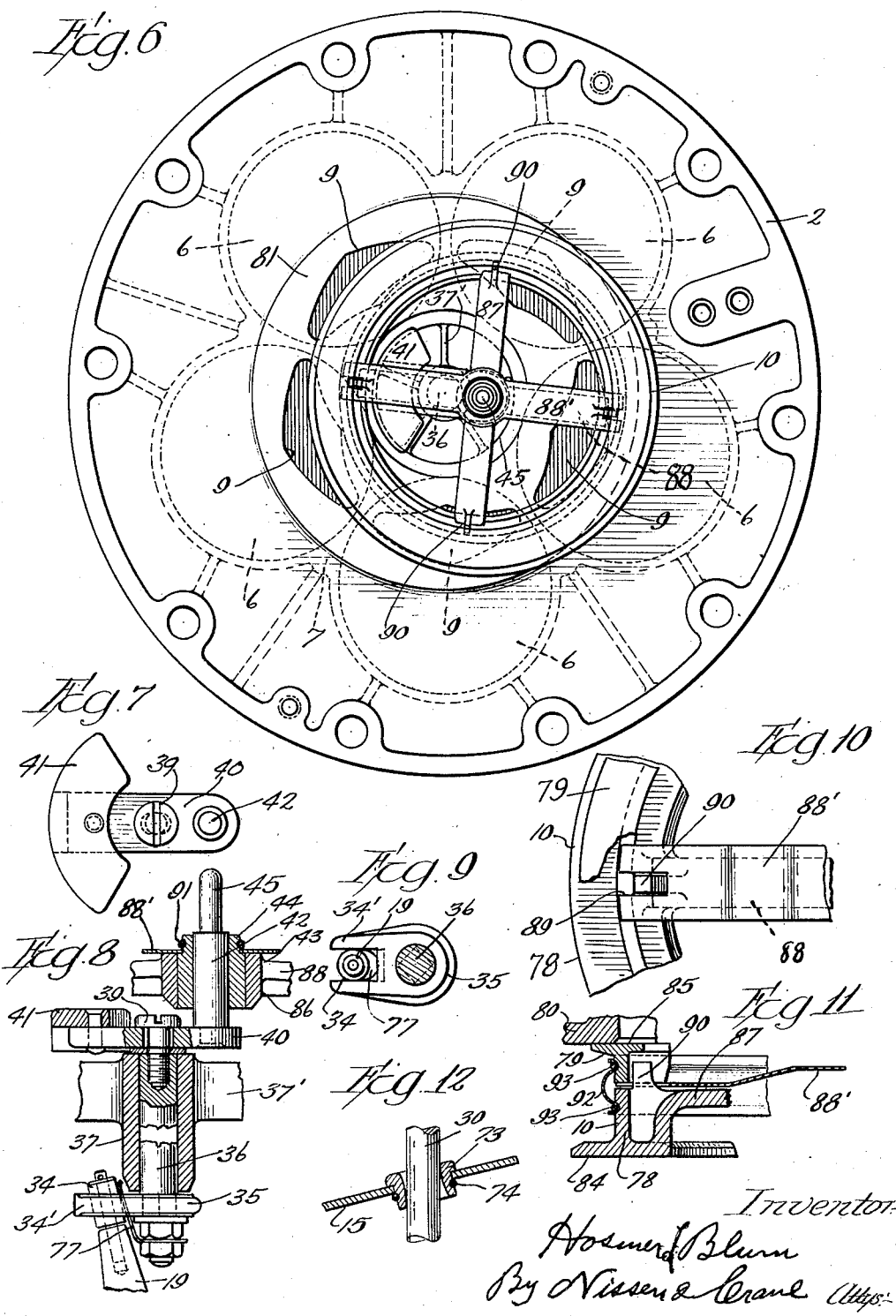

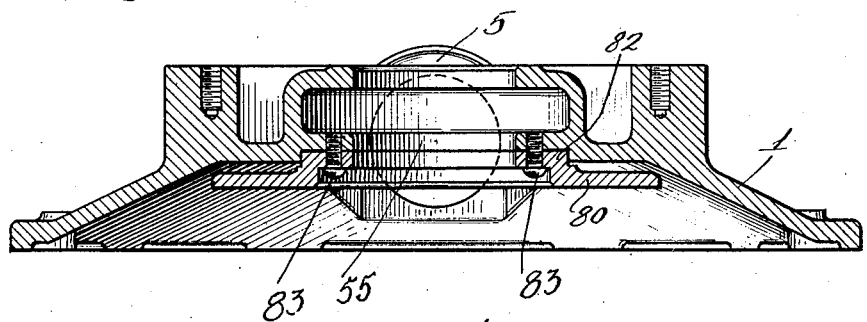
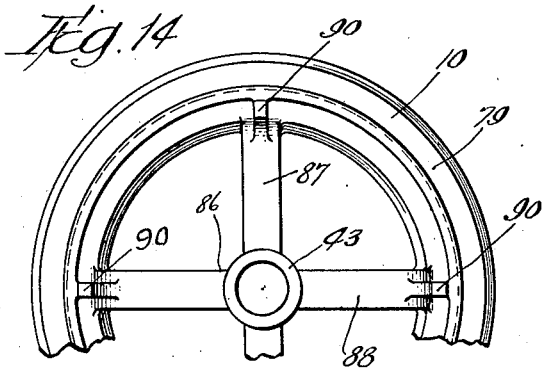
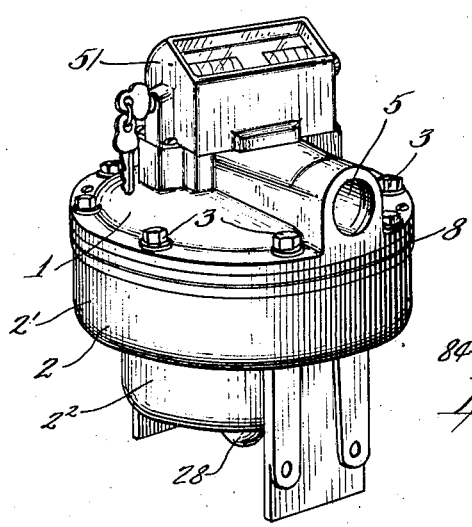
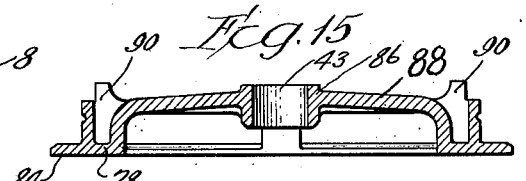
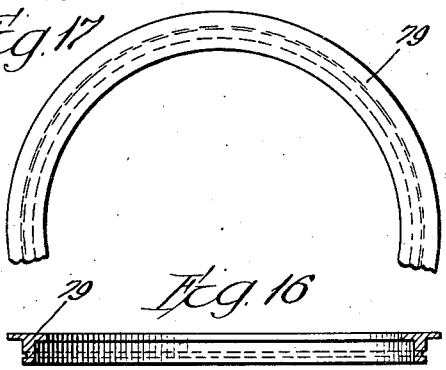
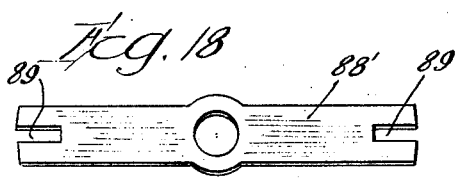

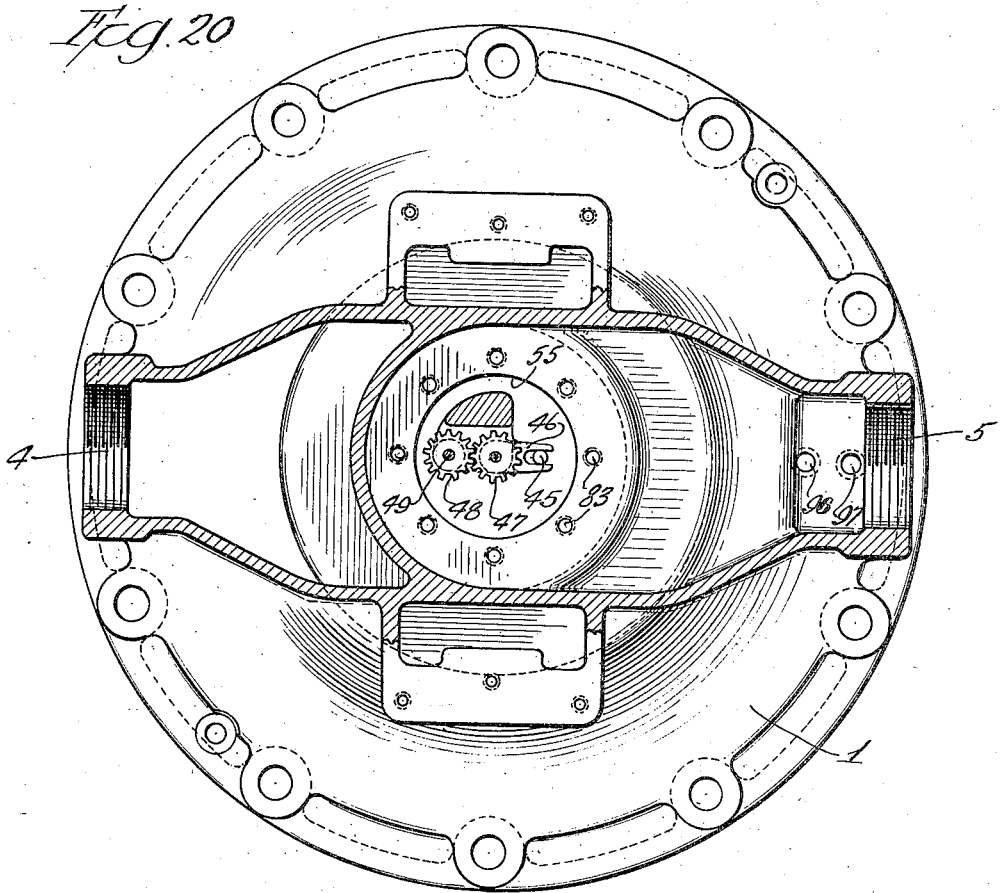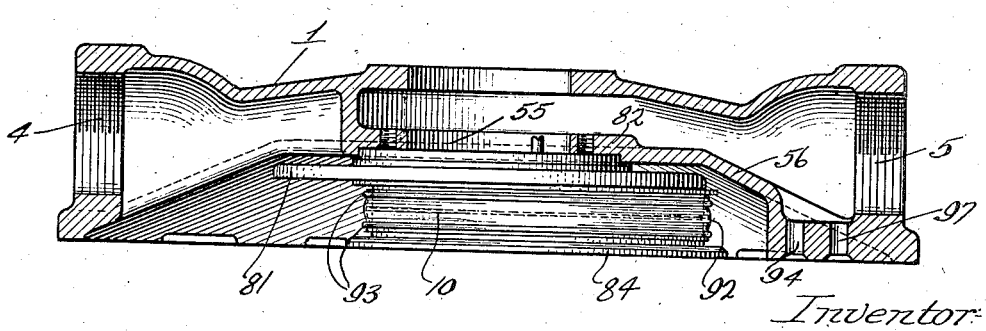

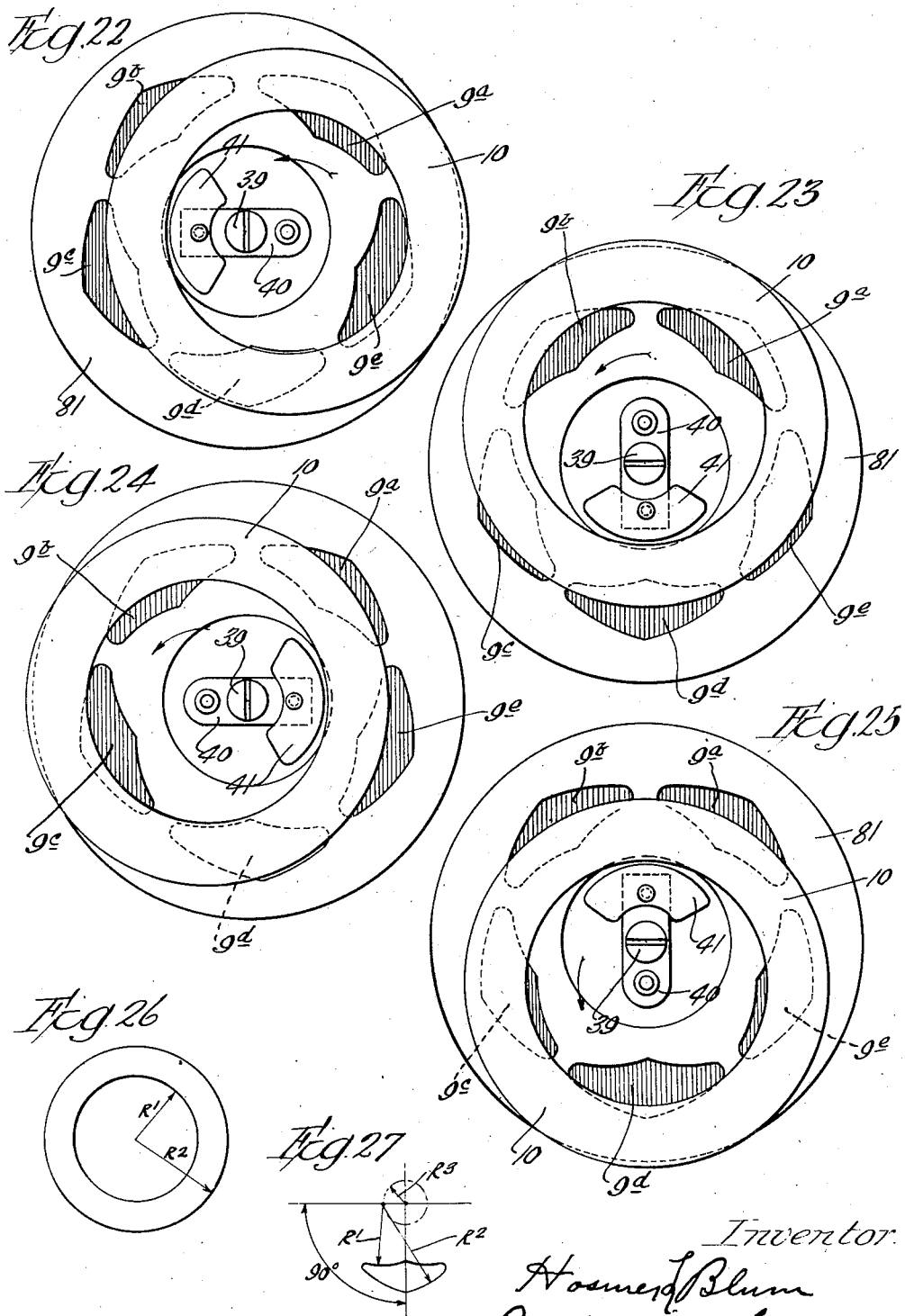

Patented Oct. 16, 1934

1,977,424

UNITED STATES PATENT OFFICE 1,977,424

FLUID METER

Hosmer L. Blum, Fort Wayne, Ind.

Application September 21, 1927, Serial No. 220,872

44 Claims. (Cl. 73—30)

My invention relates in general to meters and has particular reference to that class of meters which are operated by the fluid which they measure and upon the passage of the fluid through the same.

The primary object of my invention is to provide a fluid meter which is extremely accurate in its measurements under varying conditions of pressure, rate of flow, and viscosity of the liquid being measured.

A continued high degree of measuring accuracy of the meter is necessary in measuring quantities of oils, gasoline, alcohol, and other costly fluids. The accuracy must be consistent over a wide range of pressures and rates of flow, as tank and pipe line pressures are seldom constant. For example, a storage tank, say, for instance, thirty feet high and when full of oil, would exert a pressure on the meter employed for measuring its discharged contents of approximately ten pounds per square inch. When drained to a level of one foot, a pressure of only one-third of a pound per square inch would be imposed on the meter. A meter constructed in accordance with the salient features of my invention may be relied upon to accurately measure the discharge from the tank regardless of whether the tank is full or the liquid level thereof ranges from full to practically empty.

A meter having a non-positive valve operation results either in a portion of the liquid to be measured being by-passed or in an imperfect measurement of the fluid due to premature or delayed opening and closing of the valve ports. It is impossible to compensate accurately for that part of the fluid which is by-passed and not actually measured; consequently, it is impossible to realize an accurate measurement of the liquid intended to be measured. A volumetric meter, to measure consistently under varying conditions, must comprise a positive displacement mechanism. Slippage must be entirely eliminated and the fluid supplied to and from the measuring mechanism must be positively controlled. The valve for controlling the fluid must be properly timed and the ports so designed and constructed that the cut-off of the ports both at inlet and outlet positions will be instantaneous and positive at all rates of flow of the liquid being measured.

The meter embraced by the present invention and of which a practical embodiment is shown in the accompanying drawings for the purpose of illustration, includes these correct principles of operation. Briefly, it is a non-slip, positive displacement meter. It is capable of registering accurately to within a small fraction of one per cent. at widely varying pressures, rates of flow, and regardless of the viscosity of the liquid to be measured. As illustrated, it is of a multiple cylinder and piston type with the cylinders arranged in circular order. In reality, the meter is an improvement over that type of meter described in my prior Patent No. 1,423,597, issued July 25, 1922, and in the present case, like the prior patent, the cylinders are open at the bottom end. The liquid supplied to and from the cylinders is controlled by a valve, in the present instance, preferably an expansion disc valve of the floating type. Also, in the present case, as in the prior patent, the valve is carried on a crank and moves in an orbit over the cylinder parts with the crank receiving its motion through a drive arm which extends upwardly from a wabbling plate, so to speak, to which the pistons in the cylinders are connected. The wabble plate being, in turn, mounted by a ball and socket joint with motion imparted thereto through the successive downward strokes of the pistons with the length of the piston strokes controlled by adjusting the angle of the wabble plate.

The arrangement and co-operation of the parts just briefly outlined is common to both the present case and my prior patent, but in the present case I have made several important changes, some of which are in the detail construction of the mechanism and which have resulted in many improvements over the meter covered by my prior patent.

In the accompanying drawings—

Fig. 6 is a view in horizontal section taken approximately on the line 6—6 of Fig. 1;

Fig. 7 is a detail plan view of the counterbalance for the valve crank assembly;

Fig. 8 is a detail view in vertical section of the valve crank assembly;

Fig. 9 is a detail view in plan of the crank connecting the main drive arm with the shaft of the valve crank assembly;

Fig. 10 is a detail view in plan of a section of the peripheral edge of the valve showing a portion of the spring assembly therefor;

Fig. 11 is a detail view in vertical section of the edge of the valve;

Fig. 12 is a detail view in vertical section of a modified form of sliding connection between the wabble plate and the spacers which extend therethrough;

Fig. 13 is a vertical section of the meter cover assembly;

Fig. 14 is a detail view in plan of a section of the valve;

Fig. 15 is a detail view in section of the lower half of the valve;

Fig. 16 is a detail view in section of the upper portion of the valve;

Fig. 17 is a detail view in plan of a portion of the upper half of the valve;

Fig. 18 is a detail perspective of one of the valve springs;

Fig. 19 is a perspective view of the meter as it will appear when assembled;

Fig. 20 is a horizontal section taken approximately on the line 20—20 of Fig. 1 with the pipe section 95 omitted;

Fig. 21 is a view in vertical section of the meter cover;

Figure 1:
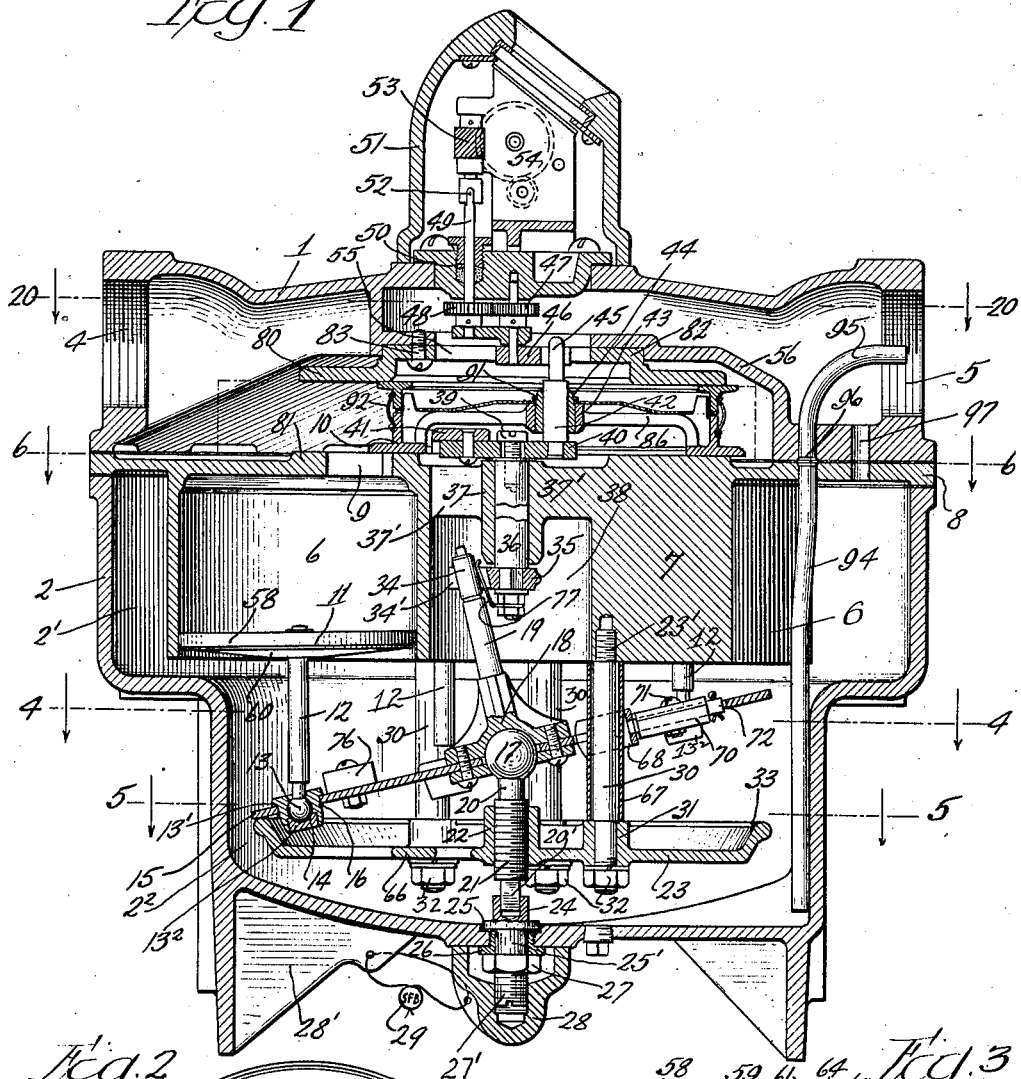
Fig. 1 is a view in vertical section through a meter constructed in accordance with one embodiment of my invention.
Figure 2:
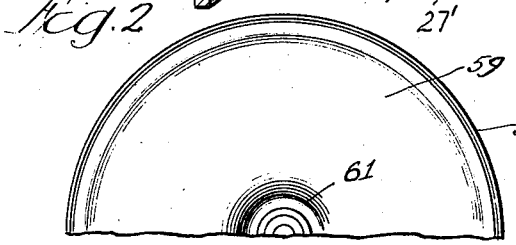
Fig. 2 is a top plan view of a portion of the piston leather.

Figs. 22 to 25, inclusive, are views in plan of the valve showing different positions of the valve with respect to the ports which it opens and closes; and Figs. 26 and 27 are diagrammatic views showing the relative radius of the valve and the ports which it controls.

Referring now to the drawings in detail, the meter is preferably made in two main parts, comprising a cover 1 and a base 2, the cover being secured to the base, as best shown in Fig. 19, by the bolts 3 which are arranged in spaced relation around the edge of the cover. The cover is provided with a fluid intake 4 on one side with an outlet 5 on the diametrically opposite side through which the fluid to be measured is passed through the meter. The base 2 is made with an upper enlarged chamber 2¹ and a restricted lower chamber 2² which serves as a well, so to speak.

The measuring mechanism is completely housed within the two parts of the casing and the cylinders 6, of which there are preferably five in number, are provided in a central insertable cylinder block 7 which is preferably formed as a casting with an annular flange 8 corresponding in diameter to the enlargement 2¹ of the base 2 and cover 1, so that it may be supported in the enlargement 2¹ of the base 2 between the upper half thereof and the lower edge of the cover 1. Suitable gaskets may be provided on the top and on the bottom of the flange 8 so that the bolts 3 will draw the base 2 and the cover 1, together with the flange 8, between the same and make a leak-proof fit. Arranged in the top of each of the cylinders 6 is a port 9 in order that the liquid to be measured when entering the intake 4 may be introduced into the cylinders 6 when the ports 9 are uncovered by the valve 10. The ports 9 are formed in a flat annular surface on top of the cylinder block 7 which provides a seat for the valve 10. This seat will be hereinafter more particularly described. The liquid thus entering the cylinders 6 will act upon the pistons 11 which are mounted in the cylinders for reciprocation in response to the pressure of the liquid on top of the same. The arrangement of the cylinders, including the ports 9 and the timing of the valve 10, is such as to open the ports 9 on the intake side of the valve 10 while opening other of the ports on the discharge side of the valve so that the liquid entering the intake 4 may be relied upon to move some of the pistons on their down strokes while lifting other of the pistons to discharge the liquid. This operation will be described more in detail in describing the construction and operation of the valve 10.

Each of the pistons 11 is equipped with a connecting rod 12 having a ball 13 on the lower end thereof, which in turn is confined in a socket 14, in the wabble plate 15. The sockets 14 for the balls 13 may be conveniently provided by making openings at spaced intervals around the wabble plate 15 adjacent the periphery thereof with a flanged sleeve or bushing 13' inserted in the openings and confined therein by a spring metal ring 16 which is snapped around the sleeve beneath the wabble plate 15. The end of the sleeve or bushing 13' has a short threaded opening for the reception of a block 13² which provides a seat for the ball 13.

The wabble plate 15 is concentrically mounted upon a ball 17 with a socket 18 on the wabble plate for the same co-axially disposed with relation to the drive arm 19. The ball 17 is provided on the upstanding end of the post 20 which has an enlarged threaded diameter 21 intermediate its ends for threaded engagement with a central sleeve 22 on the track plate 23. The lower extremity 20' of the post 20 is squared and is received in a squared socket 24 on top of a key plate 25, the latter being provided as a leak-proof closure or seal for an opening in the bottom of the base of the casing 2. The key plate 25 is seated on a ring gasket in an annular seat provided around the opening in the base of the casing and a bushing 26 is threaded into the opening below the key plate 25. The key-like stem 25' projects through the bushing 26 and is turnable therein. Its threaded end 27' is equipped with a jam nut 27 which is adapted to be threaded against the annular flange of the bushing 26 for holding the key stem against rotation. A cap 28 encloses the threaded end 27' of the key stem and the jam nut 27. To prevent tampering with the adjustment of these enclosed parts, a seal 29 may be provided between the web portion 28' on the bottom of the casing and the cap 28.

When an adjustment in the elevation of the wabble plate 15 is desired to control the stroke of the pistons 11, those in authority may break the seal 29 and unscrew the cap 28. After thus exposing the jam nut 27 and the end of the key stem, the jam nut may be loosened and a screw driver used to turn the key stem so as to turn the post 20 up or down and thus raise or lower the ball 17. After the required adjustment in elevation of the wabble plate has been made the nut 27 may be locked against the bushing 26 to hold the key 24 against rotation. The cap 28 will then be replaced and a new seal 29 applied.

When the key stem is turned in making an adjustment, the key plate 25 rotates therewith upon its annular seat and prevents any leakage of the liquid from the casing. In this connection, it is to be noted that the key plate 25 as well as its ring gasket overlaps the inserted end of the bushing 26 so as to completely overlie the opening therein through which the smooth part 25' of the stem extends. Upward pressure on a screw driver applied to the bottom of the key 24 will be counteracted by the head on the liquid in the casing 2, acting on the key plate 25. Leakage of liquid during adjustment of the elevation of the wabble plate is thus effectually prevented.

The track plate 23 is supported concentrically of the wabble plate 15 and spaced from the block 7 by a plurality of spacing rods 30 which are threaded into the block 7 at 23' with their lower ends extending through sleeve openings 31 in the track plate, nuts 32 on the ends of the rods securing the same to the track plate. The peripheral edge 33 of the track plate provides a track for the wabble plate 15 so as to limit the strokes of the pistons.

The drive arm 19 is equipped with a roller 34 adjacent the upstanding end thereof and is presented in the yoke or bifurcation 34' of the horizontally disposed crank 35 which is mounted in fixed relation to the end of the vertical drive shaft 36 of the valve crank assembly. This shaft is confined in the elongated sleeve 37 formed as a cast part of the cylinder block 7 and as the central part of a spider structure 37' in the vertical space 38 which extends through the cylinder block 7 to establish a communication from the bottom to the top of the casing. Mounted on the upper end of the shaft 36 by a set screw 39, so as to be at right angles to the crank 35, is a horizontal valve crank 40. The crank 40 is connected to the shaft 36 intermediate its ends with one end provided with a counterbalancing weight 41 and its opposite end connected to the end of an upstanding crank arm 42 which extends through the spider sleeve 43 for the valve 10 and with a suitable bushing 44 provided for the sleeve 43 between it and the crank arm. The crank pin 45 of the crank arm projects into the yoke or bifurcation of the crank 46 so as to rotate the same for driving the meshing pinions 47 and 48. The pinion 48 is connected to a drive shaft 49 which projects through a stuffing box 50 and into a cap-like housing 51 for the registering mechanism. The end of the drive shaft 49 has a pivotal driving connection as at 52 with a worm gear 53 which meshes with a gear 54 of the registering mechanism. This registering mechanism is of a conventional construction and needs no further explanation.

Particular attention is directed to the relative position of the crank 35 and the crank 40. In practice, these two parts will be disposed at right angles to one another, but for the sake of clearness they are not shown in this relative position in Figs. 1 and 8 of the drawings. The drive shaft 36, however, is shown broken away in both of these views to account for this angular position of the cranks. The timing of the valve 10 may be conveniently changed by effecting an adjustment of the set screw 39 which secures the crank 40 to the drive shaft 36.

From the construction so far described it will be perfectly clear that the pressure of the liquid introduced into the intake 4 will operate the pistons 11 in the cylinders 6, the reciprocation of which wabbles the wabble plate 15, imparting a drive to the drive arm 19, which in turn rotates the shaft 36 through the crank 35. The shaft 36 rotates the valve 10 in an orbital path through the crank 40 and the arm 42 so that the ports 9 are uncovered to discharge the liquid contained in the cylinders on the inside of the valve 10, where it will be discharged through the opening 55 in the partition 56, which separates the cover 1 with an intake side and an outlet side.

Figure 3:
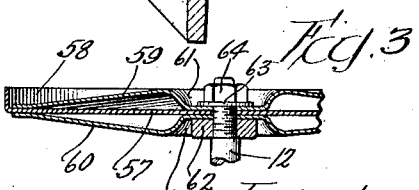
Fig. 3 is a detail view in vertical section of one of the pistons.

To prevent any possible slippage or leakage of the liquid past the pistons 11, the same are especially constructed to make a perfectly leak-proof fit in the cylinders. This is important because the wabbling movement of the plate 15 will also tilt or wabble the pistons. The ball and socket arrangement between the piston rods and the wabble plate will compensate to some extent for this movement but not entirely. I therefore propose to make the pistons each with a thin peripheral edge and a reinforced central area. To this end I prefer to construct the same with a leather disc 57 having an upturned annular flange or cup 58 and to confine the disc part of the leather between upper and lower spring metal followers 59 and 60. These metal followers will be made with a central depression 61 so as to lie flush with the leather disc 57 around the central area thereof and with registering openings in the leather and the followers through which the piston rod 12 extends. The end of the piston rod in this connection has a reduced threaded diameter so as to provide a shoulder for supporting the bottom washer 62. The other side of the assembly is provided with a washer 63 with a clamping nut 64 engaging the reduced threaded end of the piston rod and tightly clamping the parts together. The followers are bulged outwardly from the leather disc near their central portions as shown in Fig. 3 so that their peripheral edges only lie flush with the leather 57. The followers as thus constructed hold the upturned flange or cup 58 flush against the cylinder walls and prevent the leather 57 from wrinkling or otherwise becoming displaced notwithstanding the tilting motions imparted to the pistons by the wabbling operation of the plate 15. One feature of this piston assembly is the thin, peripheral edge permitting the limited wabbling in its cylinder without binding with the walls thereof and without preventing the cup or flange 58 from retaining a close fit with the cylinder.

As previously stated, the construction of the pistons 11 is of considerable importance. They are light and yet rigid and of minimum thickness at their edges where they exert a spring tension against the leather thereof so as to make a leak-proof contact with the cylinder walls, and, as also stated, the construction and assembly of the valve is capable of developing a high degree of efficiency.

Figure 5:
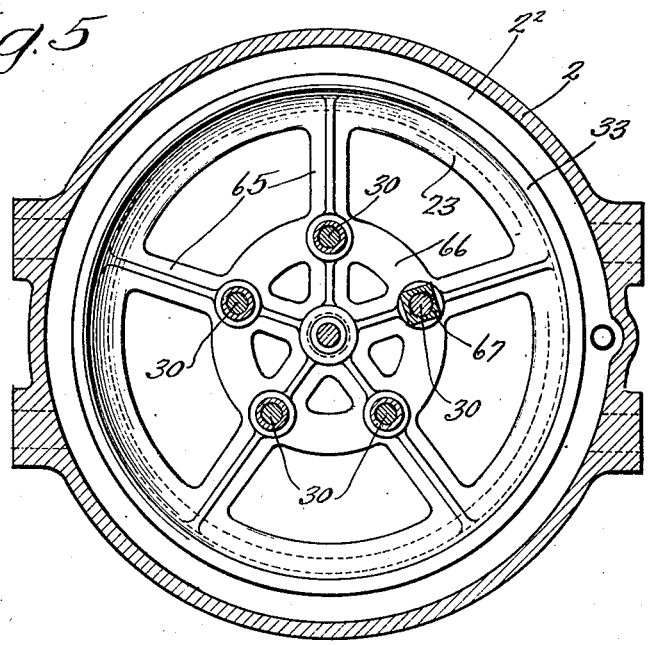
Fig. 5 is a view in horizontal section taken approximately on the line 5—5 of Fig. 1.

By referring to Fig. 5, it will be seen that the track plate 23 is made with a series of connecting webs 65 connecting an annular ring-like part 66 with the rim of the plate. The spacers 30 for the plate 23 are provided in this ring-like central part 66. To prevent rotation of the wabble plate 15, one of the spacers 30 is equipped with a square sleeve 67 which is embraced by a yoke 68 having a stem 69 free to oscillate in the bore of a block 70 which is secured on top of the wabble plate 15 by screws, or the like, 71. The yoke 68 slides freely along the square sleeve 67 as the plate 15 wabbles, but holds the plate against rotation, as stated.

For a modified form of this retaining means of the wabble plate, attention is invited to Fig. 12. In this form, the spacers 30 will all extend through the wabble plate and each will be provided with a bushing 73 in the openings in the wabble plate, the same being retained in the openings by wire rings 74 which encircle the bushings below the wabble plate. Since all of the spacing rods are thus extended through the wabble plate, and each provided with a bushing 73, it will be possible for the plate 15 to wabble but not to rotate. However, if the spacing rods project through the wabble plate in slots 75, as shown in Fig. 4, it will be necessary to employ a retaining device, such as the yoke 68 and the squared sleeve 67.

Figure 4:
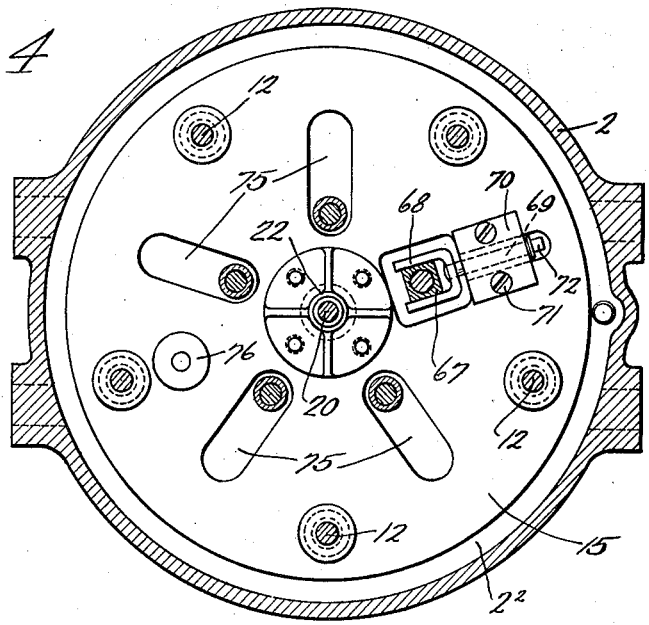
Fig. 4 is a view in horizontal section taken approximately on the line 4—4 of Fig. 1.

The wabble plate 15 should also be provided with a counterbalancing weight 76, as illustrated to the best advantage in Figs. 1 and 4. A leaf spring 77 may also be connected to the end of the shaft 36 and bent into an upstanding angular position to press against the roller 34 on the drive arm 19 to aid in keeping the wabble plate in contact with the track 33 on the track plate.

The construction of the valve 10 is perhaps best illustrated in Figs. 1, 6, 10 and 11, and comprises an expansion ring structure of the floating type, preferably made in two co-operating parts 78 and 79. The same is confined between the valve guide 80 and an annular seating surface 81. The annular surface 81 is provided on top of the cylinder block or casting 7 and surrounds the ports 9, and the valve 10 wipes across the same when it is operated to open and close the ports. The valve guide 80 is a separate piece with the valve contacting surface in the form of an annular flange disposed parallel to the surface 81. The mounting for the flange 80 is a ring-like part 82, which is seated in the recess made to receive it in the partition 56, screws, or the like, 83 being employed to secure the same to the partition.

The valve per se, as stated, is constructed in two parts 78 and 79, the lower part 78 having a relatively wide flat under surface 84 which wipes over the flat surface 81 and the upper part 79 having a similar flat but relatively narrow surface 85 for wiping against the flat under side of the flange of the guide 80. The lower part 78 of the valve comprises a spider 86 having intersecting arms 87 and 88 which carry the sleeve 43 for connecting the same in driving relation with the crank pin 42. The valve thus receives its orbital movement from the crank 40.

The two parts of the valve are assembled by means which will not only hold the same together, but which will also expand the parts to hold their respective wiping surfaces in contact with the under side of the guide 80 and the annular surface 81 under tension. This means preferably comprises a spring 88' with slots 89 in the ends of the spring for the reception of one pair of the upstanding guide lugs 90 on the lower part 78 of the valve. The lugs 90 hold the upper part of the valve concentric with the lower part. The tension of this spring spreads the parts of the valve under tension while the lugs 90 serve as guides and radial abutments. The spring is held in place by a spring wire ring 91 which overlies the spring and is seated in the annular recess around the bushing 44. To seal the split joint between the two parts of the valve and also hold the parts together, a band of flexible material, such as leather, kid, or the like, 92, encircles the valve and overlies the split joint between the same. The ends of this leather band are wired as at 93 to the two parts of the valve with recesses in which the material of the band is clinched by the wires to prevent slipping of the band.

Referring to Figs. 22 to 25, inclusive, of which 10 as in the other figures designates the valve, and the annular seating surface 81 is also illustrated, it will be noted that the ports are grouped in annular spaced relation. For the sake of clearness the ports in these figures are numbered $9^a$, $9^b$, $9^c$, $9^d$ and $9^e$. Now with the valve operated relatively to these ports so as to open and close the same and starting from the position shown in Fig. 22, it will be seen that the port $9^d$ is all but closed, there being a slight opening in the discharge side of the valve. When the valve is in this position, the piston in the cylinder beneath this port is at the extreme upper end of its stroke, upper dead-center, so to speak. In other words, the piston has just completed its discharging stroke. The ports $9^e$ and $9^a$ are open on the discharge side of the valve. The pistons in the cylinders which these ports $9^e$ and $9^a$ control are moving upwardly and discharging through the same. The pistons in the cylinders which are controlled by the ports $9^b$ and $9^c$ are moving downwardly due to the pressure exerted on them by the fluid entering the same from the intake side of the valve.

Fig. 23 shows the position of the valve when the piston beneath the port $9^d$ is at its mid down stroke. The ports $9^c$, $9^d$, and $9^e$ are open to the outside or intake side of the valve. The pistons in the cylinders which these ports control are moving downwardly. The pistons in the cylinders which the ports $9^a$ and $9^b$ control are moving upwardly and discharging their contents through these ports on the discharge side of the valve.

Fig. 24 shows the position of the valve when the piston in the cylinder which is controlled by the port $9^b$ is at its lower dead center. The port $9^d$ is here shown to be nearly closed to the incoming fluid on the intake side of the valve. The cylinders controlled by the ports $9^e$ and $9^a$ are filling and the cylinders controlled by the ports $9^b$ and $9^c$ are discharging.

Fig. 25 shows the position of the valve when the piston in the cylinder controlled by the port $9^d$ is at its mid up stroke. The cylinders controlled by the ports $9^a$ and $9^b$ are filling and the cylinders controlled by the ports $9^c$, $9^d$ and $9^e$ are discharging.

These four views show a complete cycle of operation of the valve and its properly assembled relation relative to the ports for accurate measurement of liquid. The adjusting set screw 39 for the valve crank 40 is also shown in these views and it will be seen that by loosening the set screw the valve may be adjusted relative to the ports so as to obtain the properly timed relation of the valve.

In Figs. 26 and 27 it will be noted that the radius $R'$ of the valve is equal to the radius $R'$ of the ports, only one port being shown for this particular illustration, and that the radius $R^2$ of the valve is approximately equal to the radius $R^2$ of the ports. The circle described by the radius $R^3$ in Fig. 27 represents the travel of the valve crank pin 42. These radii $R'$ and $R^2$ of the ports are also taken in this circle at points 90° from the center line of the ports.

It will be noted from Figs. 22 and 24 that as the valve reaches the position of port cut-off, the outside edge of the valve face and one-half of the outside profile of the port $9^d$ are parallel and that the inside edge of the valve face and the inside profile of one-half of the port $9^d$ are also parallel. By so shaping the ports, a maximum area of effective port opening is obtained and instantaneous clean cut-off is assured.

In Figs. 22 to 25, inclusive, it will be seen that the outer peripheral edges of the valve extend a little beyond the outer peripheral edges of the seats. This produces a wiping action which keeps the valve seats clean and smooth.

One of the features of this invention, at least that part thereof which is concerned with the valve and the ports, is the elongated construction, so to speak, of the valve ports. Such an elongated construction for the ports develops very efficient results and is not to be compared with comparatively small areas of round ports. Another feature of the invention resides in the adjustable positioning of the valve with relation of the ports and piston dead-centers, as well as its wiping action over the edges of the seats therefor.

Referring particularly to Fig. 1, it will be noted that the base of the casing is equipped with an ejector tube 94, one end of which terminates adjacent the base of the casing with its opposite end terminating in the curved extremity 95 in the outlet 5. In practice, this ejector tube will be made in two sections joined by fluted ends as at 96 so as to accommodate it to the two parts 1 and 2 of the casing. The purpose of this tube is for ejecting water from the bottom of the meter so as to prevent the same from freezing. A vent 97 is also provided in the outlet 5 which leads into the base of the casing so as to vent the base without by-passing the liquid. It is not a by-pass, because the liquid by the time it reaches the outlet 5 has been measured and it makes no difference whether the same is returned to the base or not. The same is true with respect to the ejector tube 94 because only measured liquid reaches the base of the casing below the pistons 58.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States, is:

1. In a liquid meter, the combination with a series of cylinders, of means affording ports therefor, pistons mounted for reciprocation in said cylinders in response to the liquid introduced through said ports, a circular resiliently expanded valve for opening and closing said ports, means for converting the reciprocatory movement of the pistons into a rotary movement for the valve to move the same across said ports, said means comprising piston rods for the pistons, a wabble plate to which said rods are connected, a drive arm mounted on said plate, and a counterbalanced crank for the valve driven by said drive arm.

2. In a liquid meter, the combination with a series of cylinders having pistons mounted therein, of means affording ports for said cylinders, spaced-apart seats, and a circular valve mounted between said seats to move across said ports to open and close the same, said ports being elongated in the direction of the circumference of the valve and each having a profile with compound curvatures, each of said curvatures corresponding to the curvature of the inner and outer circumferences of the valve.

3. A liquid meter embodying in its construction a circular valve having an opening therethrough for the flow of liquid through the valve, and spaced-apart seats for the peripheral portions of said valve at both sides thereof, one of said seats having ports elongated in the direction of the circumference of the valve and each having a profile with curvatures corresponding to the inner and outer circumferences of the valve.

4. A liquid meter embodying in its construction a circular valve sectioned to provide co-operating rim parts, spider arms within the rim of one of said parts and providing a central sleeve, guide members at the outer ends of said spider arms for centering the other rim part, a leaf spring mounted at the central sleeve with its ends flexed and projecting into the space between the rim parts to force said parts away from each other, said spring having slots adjacent the ends thereof for the reception of said guide members at the outer ends of said spider arms, and a band of flexible material secured to the outside of the rim parts for connecting such rim parts.

5. A liquid meter embodying in its construction a cylinder, and a hollow piston mounted for reciprocation therein and comprising symmetrical discs each having a relatively thin flat peripheral edge portion and a reinforced central area, and a flexible washer secured between the flat edge portion of the discs and having a portion extending beyond the flat edge portion to provide a flexible flange in position to snugly engage the walls of the cylinder.

6. A liquid meter comprising a cylinder, and a piston mounted for reciprocation therein and having near its center a hollow bulging portion flaring and tapering to a relatively thin peripheral edge and a cupped leather at such thin peripheral edge, and a piston rod at right angles to the circular portion of said leather and at right angles to the planes of the peripheral edge portions of the piston.

7. A liquid meter comprising a rotary wabble member, a measuring cylinder, a piston reciprocable in said cylinder, and a piston rod connected between said wabble member and said piston, said piston comprising a disc of flexible material having a peripheral flange to form a cup, and hollow spring metal bulging discs having flat peripheral portions to engage opposite sides of said disc of flexible material to clamp the cup in predetermined position.

8. In a liquid meter, the combination with a casing having an opening and a seat surrounding said opening, of measuring mechanism in said casing, a turnable key-like stem projecting into said casing through said opening, a bushing through which said key-like stem extends, a plate on the key-like stem to turn therewith and seating upon said seat, and means operable by turning said key-like stem to regulate said measuring mechanism.

9. In a liquid meter, a casing, measuring mechanism in said casing, and means operable from the outside of the casing for regulating said mechanism comprising a turnable key-like stem projecting into said casing through an opening therein, a bushing in said opening for said key-like stem, a plate on the key-like stem seated on the inner end of said bushing and upon a seat surrounding said bushing, a nut on the threaded outer end of the key-like stem adapted to be jammed against the outer end of said bushing, and a cap for enclosing the outer end of the key-like stem and said jam nut, said cap being provided with means for accommodating an anti-tampering seal.

10. In a liquid meter, a casing having an inlet and outlet, means for measuring liquid flowing through said casing, and an ejector tube extending into the casing from the outlet and terminating adjacent the bottom of the casing.

11. In a liquid meter, the combination with a wabble plate having an opening therein, a rod projecting through said opening in the wabble plate, a squared sleeve on said rod, and a yoke pivotally mounted on the wabble plate in position to straddle said squared sleeve on said rod to hold the wabble plate against rotation.

12. A liquid meter embodying in its construction a sectional circular valve, spaced apart members having bearing surfaces for said valve, means for expanding said valve against said bearing surfaces to contact with the latter under the tension of said expanding means, and means providing ports in one of said surfaces controlled by said valve, said ports being arranged in circular formation and elongated in the direction of the circumference of the valve.

13. A meter of the displacement type for measuring liquids, comprising a block having a plurality of cylinders and a plurality of ports, one for each of said cylinders, a circular ring valve having an opening therethrough for receiving the flow of the liquid from said ports, and spaced-apart seats for the peripheral portions of said circular ring valve, said ports being associated with one of said seats and each elongated in the direction of the circumference of said valve.

14. A meter of the displacement type for measuring liquids, comprising spaced-apart valve seats one having an outlet port, the other having a plurality of spaced-apart ports, and a ring valve mounted between said valve seats for controlling said ports, said spaced-apart ports being elongated in the direction of the circumference of the valve and each having a profile with curvatures corresponding to the inner and outer circumference of said ring valve.

15. A liquid meter embodying in its construction a circular valve for controlling a series of ports through which the liquid to be measured flows, and spaced-apart valve seats for said valve with an outlet port through one of the valve seats, the other ports being in the other valve seat and elongated in the direction of the circumference of the valve and each having a profile with curvatures corresponding to the inner and outer circumferences of the valve.

16. A liquid meter embodying in its construction a cylinder, and a piston mounted for reciprocation in said cylinder comprising a disc of flexible material having a flanged edge, and spaced spring metal discs having flat central portions and outwardly bulging intermediate portions with their flat peripheries adapted to clamp opposite sides of the flexible disc at the base of the flanged edge.

17. A liquid meter comprising a wabble member, a measuring cylinder, a piston reciprocable in said cylinder, a piston rod connected to said wabble member, said piston comprising a peripheral cup of flexible material clamped by spring metal discs having flat central portions and intermediate outwardly bulging portions with their flat peripheries clamping opposite sides of the peripheral portion of the cup, and means for securing the flat central portions of said spring metal discs to said piston rod and holding the peripheries of said spring metal discs in clamping engagement with said cup.

18. In a liquid meter, the combination with a casing having an inlet and an outlet, of means in said casing for measuring flow of liquid from the inlet to the outlet, and an ejector tube extending from the bottom of said casing to said outlet.

19. In a liquid meter, the combination with a casing having a lower bowl-shaped portion with an inlet and an outlet in the upper portion of said casing, of means for measuring liquid flowing through said casing, and an ejector tube extending from the bottom of said bowl to the outlet in the casing for the purpose of ejecting accumulation of water in the bottom of the bowl to prevent the same from freezing.

20. In a liquid meter, the combination with a casing having an inlet and an outlet, of means for measuring liquid flowing through said casing, and an ejector tube leading from the bottom of said casing to said outlet, said measuring means being so located that said ejector tube directs to said outlet only liquid which has been measured.

21. A liquid meter embodying in its construction a sectional ring valve, a diametrical spring for spreading apart the sections of said valve, and a ring of flexible material for connecting the peripheral portions of the sections of said valve.

22. A liquid meter embodying in its construction a sectional valve, a spring for spreading apart the sections of said valve, and a leather ring connected to the sections of said valve to seal the space between them.

23. A liquid meter comprising spaced-apart valve seats in spaced-apart parallel planes, a valve having sections respectively engaging said valve seats, a diametrical spring engaging the central portion of one of said valve sections and the peripheral portion at diametrically opposite points of the other section to yieldingly hold said valve sections against their respective valve seats, and a band of flexible material connected to said sections to cover the space between the same.

24. In a liquid meter, the combination with a casing having an opening in its bottom and a seat surrounding said opening, of measuring mechanism in said casing, means for regulating said measuring mechanism comprising a turnable key-like stem projecting into the casing through said opening, a flange on said stem adapted to fit said annular seat at the bottom of said casing, and means for securing said flange to said seat and hold said stem against turning.

25. In a liquid meter, the combination with a casing having an opening in its bottom, of measuring mechanism in said casing, and means operable from the outside of said casing for regulating said mechanism comprising a turnable key-like stem projecting into said casing through said opening, and a cap for enclosing the outer end of said key-like stem.

26. In a liquid meter, the combination with a casing having an opening therein, of measuring mechanism in said casing, and means operable from outside of the said casing for regulating said mechanism comprising a turnable key-like stem projecting into said casing through said opening and having a transverse screw driver slot in its outer end, and a cap having a screw-threaded recess for engaging screw threads on the outer end of said key-like stem.

27. In a liquid meter, the combination with a casing having an opening therein, of measuring mechanism in said casing, and means operable from outside of said casing for regulating said mechanism comprising a turnable key-like stem projecting into said casing through said opening and having its outer end portion screw-threaded, means for locking said key-like stem in adjusted position, and a closure for said locking means comprising a cap screw-threaded onto the screw-threaded outer portion of said key-like stem.

28. In a liquid meter, the combination with a wabble plate having openings therein, of a circular track along which said plate is adapted to wabble, means for supporting said track comprising a plurality of spaced-apart rods projecting through said openings in said wabble plate, and means connected between said wabble plate and one of said rods for preventing the edges of the openings in the wabble plate from engaging said rods.

29. In a liquid meter, a wabble plate having an opening therein, and means for holding said wabble plate against rotation comprising a rod extending through said opening in the wabble plate, and a yoke pivotally mounted on said wabble plate in position to straddle said rod.

30. In a liquid meter, a wabble plate having an opening therein, and means for holding the same against rotation comprising a rod having flat engaging surfaces and extending through said opening in the wabble plate, and a yoke journaled in the wabble plate for oscillation in position to straddle said flat engaging surfaces at the sides of said rod.

31. In a liquid meter, the combination with a series of cylinders, of means affording ports therefor, pistons mounted for reciprocation in said cylinders in response to the liquid introduced through said ports, a circular valve for opening and closing said ports, said valve being a sectional valve and comprising two seating members and resilient means urging the seating members apart, means for converting the reciprocatory movement of the pistons into a rotary movement for the valve to move the same across said ports, comprising piston rods for the pistons, a wabble plate to which said rods are connected, means co-operating with said wabble plate to prevent rotation thereof, a counterweight on the wabble plate to counterbalance the last named means, a drive arm mounted on said plate, and means driven by said drive arm for rotating said valve.

32. In a liquid meter, the combination with a series of cylinders, of means affording ports therefor, pistons mounted for reciprocation in said cylinders in response to the liquid introduced through said ports, a circular valve for opening and closing said ports, means for converting the reciprocatory movement of the pistons into a rotary movement for the valve to move the same across said ports, said means comprising piston rods for the pistons, a wabble plate to which said rods are connected, a track for governing the angular movement of said wabble plate, and resilient mechanism for holding said plate on said track.

33. A liquid meter embodying in its construction a sectional circular valve adapted to have liquid flow through the same from one side thereof to the other, spring means for expanding said valve, and means for sealing the space between the valve sections and for holding the sections of the valve together, which sections are under the influence of said spring means.

34. A liquid meter comprising a piston having a substantially flexible member provided with a peripheral flange, a pair of co-operating metal discs arranged on opposite sides of the flexible member, said discs engaging the flexible member at the center of the flexible member and at its peripheral portion just behind the flange of the flexible member, said discs having an outward bulge intermediate the central and peripheral portions thereof and being imperforate outwardly of the central portions so that when clamped together upon the flexible member an armoured piston head with flexible peripheral sealing flange and central imperforate metallic wall is provided.

35. A liquid meter comprising an annular valve and means providing a bearing surface against which the valve may operate, said means having port openings on said surface and controlled by said valve, said ports being arranged in annular formation and being elongated in the direction of the circumference of the valve.

36. In a device of the class described, the combination of means, forming a valve seat, provided with a plurality of spaced apart ports and a ring valve mounted to operate on said valve seat for controlling said ports, said ports being elongated in the direction of the circumference of the valve and having edges defined by curves corresponding to the curves of the inner and outer edges of the ring valve.

37. In a device of the class described, casing means having an outlet and comprising a bowl having a peripheral edge, a cover defining an inlet chamber, and a cylinder block comprising a plate extending across the bowl and secured at its edges by and between the edges of the bowl and the cover, said plate having depending means forming cylinders extending into the bowl and perforations communicating the interior of the cylinders with the inlet chamber, displacement devices carried by the casing means and having parts associated with said cylinders, valve means shiftable on said cylinder block and operatively connected to the displacement devices and operable thereby to progressively open and close the perforations whereby fluid introduced into the inlet chamber of the cover may be drawn successively into the cylinders and progressively expelled therefrom through said openings to said outlet, said cylinder block having a central opening communicating the bowl with said valve in position to receive the fluid discharged from said cylinders, additional means connecting said bowl with said outlet, and counter means actuated by said displacement devices for indicating the amount of fluid delivered by way of the cylinder and the valve from the inlet chamber to the outlet chamber of the device.

38. A liquid meter comprising a cylinder and a piston mounted for reciprocation therein, said piston comprising a flexible washer, and a pair of relatively thin formed discs on opposite sides of the washer, said discs bulging oppositely outwardly of the washer, inwardly of the peripheral edges thereof and having substantially flat outer peripheral portions engaging the washer adjacent its peripheral edge, said washer extending beyond the edges of the discs to form a flexible flange in position to sealingly engage the walls of the cylinder and means located inwardly of the outwardly bulging portions of the discs to hold the same together on opposite sides of the washer.

39. A fluid meter comprising means forming a casing defining a fluid flow channel having an inlet opening and an outlet opening, displacement means in the casing and associated within the flow channel for measuring the fluid flowing through the channel, said displacement means comprising a plurality of circularly arranged pistons, said casing comprising separately formed parts including a block part formed with circularly arranged cylinders in which the pistons are reciprocable and having a central channel, a cover part in which is formed the inlet opening and a bowl part, said parts being fastened together with the block part held by and between the cover and bowl parts, said cover and block parts providing a valve chamber therebetween, a valve in said chamber, one of said parts having a valve seat for said valve with port openings in communication each with a cylinder of said block part on one side of the pistons therein, said cylinders having open ends on the side of the block part enclosed by the bowl part and said pistons having connections projecting out through the open ends of the cylinders, a wabble plate connected to the piston connections outside of the cylinders and within the bowl whereby to gyrate the wabble plate when the pistons move in the cylinders, said bowl enclosing said wabble plate and being in communication with the valve through the central opening of the block part, and means extending through said central opening of the block and operatively connecting the wabble plate with the valve whereby to shift the valve in response to the movement of the cylinders to place the port openings of the valve seat alternatively in communication either with the inlet opening in the cover or with the bowl and the outlet, and means forming a channel communicating the bowl with the outlet.

40. A fluid meter comprising means forming a casing defining a fluid flow channel having an inlet opening and an outlet opening, displacement means in the casing and associated within the flow channel for measuring the fluid flowing through the channel, said displacement means comprising five circularly arranged pistons, said casing comprising separately formed parts including a block part formed with five circularly arranged cylinders in which the pistons are reciprocable and having a central channel, a cover part in which is formed the inlet opening and a bowl part, said parts being fastened together with the block part held by and between the cover and bowl parts, said cover and block parts providing a valve chamber therebetween, a valve in said chamber, one of said parts having a valve seat for said valve with port openings in communication each with a cylinder of said block part on one side of the piston therein, said cylinders having open ends on the side of the block part enclosed by the bowl part and said pistons having connections projecting out through the open ends of the cylinders, driving means connected to the piston connections outside of the cylinders and within the bowl and operable when the pistons are moved in the cylinders, said bowl enclosing said driving means and being in communication with the valve through the central opening of the block part, means forming a channel, other than said central opening, for communicating the bowl with the outlet opening, and means extending through said central opening of the block and operatively connecting the driving means with the valve whereby to shift the valve in response to the movement of the cylinders to place the port openings of the valve seat alternatively in communication either with the inlet opening in the cover or with the bowl and the outlet.

41. A fluid meter comprising means forming a casing defining a fluid flow channel having an inlet opening and an outlet opening, displacement means in the casing and associated within the flow channel for measuring the fluid flowing through the channel, said displacement means comprising a plurality of circularly arranged pistons, said casing comprising separately formed parts including a block part formed with circularly arranged cylinders in which the pistons are reciprocable and having a central channel, a cover part, in which is formed the inlet opening, and a bowl part, said parts being fastened together with the block part held by and between the cover and bowl parts, said cover and block parts providing a valve chamber therebetween, a valve in said chamber, one of said parts having a valve seat for said valve with port openings in communication each with a cylinder of said block part on one side of the piston therein, said pistons comprising washer forming means and a pair of relatively thin formed discs on opposite sides of the washer forming means, said discs having substantially flat outer peripheral portions engaging the washer forming means adjacent its peripheral edge, said discs bulging oppositely outwardly of the washer means, inwardly of the peripheral edges of the discs, said washer forming means extending beyond the edges of the discs and having flanged edges in position to sealingly engage the walls of the cylinder in which the piston operates, and holding means located inwardly of the outwardly bulging portions of the discs to hold the same together on the opposite sides of the washer forming means, said cylinders having open ends on the side of the block part enclosed by the bowl part and said pistons having connections cooperatively associated with said holding means and projecting out through the open ends of the cylinders, a wabble plate connected to the piston connections outside of the cylinders and within the bowl whereby to gyrate the wabble plate when the pistons move in the cylinders, said bowl enclosing said wabble plate and being in communication with the outlet and in communication with the valve through the central opening of the block part, and means extending through said central opening of the block and operatively connecting the wabble plate with the valve whereby to shift the valve in response to the movement of the cylinders to place the port openings of the valve seat alternatively in communication either with the inlet opening in the cover or with the bowl and the outlet.

42. In a device of the class described, casing means comprising a bowl provided with a peripheral edge and a cover forming an inlet and an outlet in said casing, and a cylinder block comprising a plate extending across the bowl and secured at its edges by and between the edges of the bowl and the cover, said plate having means forming cylinders extending into the bowl, and port perforations communicating the interior of the cylinders with the inlet in the cover, said plate having a central opening forming a channel communicating with said bowl, displacement means having parts associated with the cylinders, valve means shiftable on said cylinder block and operatively connected to the displacement means and operable thereby to progressively open and close the port perforations whereby fluid introduced into the meter inlet may be drawn successively into the cylinders and progressively expelled therefrom into communication with the central channel of the cylinder block and thence to the meter outlet, counter means actuated by the displacement means to indicate the amount of fluid delivered by way of the cylinder and valve to the meter outlet, and means forming a channel communicating said bowl with said outlet.

43. In a liquid meter, the combination of a casing comprising a bowl and a cover therefor and having an inlet and an outlet, displacement means in the casing for measuring fluid flowing through the casing from said inlet to said outlet, said displacement means comprising a plurality of circularly arranged pistons and including a block formed with circularly arranged cylinders in which said pistons reciprocate, said cover and said bowl being fastened together to form the casing with the block held by and between the cover and bowl, said cover and block providing a valve chamber therebetween and said block being formed with a valve seat in said chamber, a valve seating member comprising a plate mounted on said cover in position facing and in spaced relationship with respect to said valve seat, a valve member having opposed seating surfaces mounted between said valve seat and said seating member, yielding means for urging said seating surfaces into engagement one with said valve seat and the other with said seating member, port openings in said valve seat in communication each with a cylinder of said block part on one side of the piston therein, said cylinders being enclosed by the bowl part of the casing, said pistons having connections projecting from said cylinders into said bowl part, a wabble plate in said bowl part and connected to the piston connections outside of the cylinders whereby to gyrate the wabble plate in response to piston movement in the cylinders, and means journalled in said block part and operatively connecting the wabble plate with the valve whereby to shift the valve on the valve seat in response to the movement of the pistons.

44. In a liquid meter, the combination of a casing having a cover and a bowl, an inlet passageway leading from a source of liquid supply into said cover, metering means for measuring the liquid flow including a valve, said metering means forming a partition in said casing separating the cover and bowl and said metering means including wabble plate operating mechanism within the bowl, a passageway leading from the metering means into the bowl, and an exhaust passageway leading from said bowl.

HOSMER L. BLUM.